United States Patent [19]

George et al.

[11] 4,087,763

[45] May 2, 1978

[54] METHOD AND APPARATUS FOR SECONDARY LASER PUMPING BY ELECTRON BEAM EXCITATION

[75] Inventors: E. Victor George, Livermore; William F. Krupke, Pleasanton; John R. Murray, Livermore; Howard T. Powell, Livermore; James C. Swingle, Livermore; Charles E. Turner, Jr., Livermore; Charles K. Rhodes, Palo Alto, all of Calif.

[73] Assignee: The United States of America as represented by the United States Department of Energy, Washington, D.C.

[21] Appl. No.: 630,843

[22] Filed: Nov. 10, 1975

[51] Int. Cl.² .............................................. H01S 3/00
[52] U.S. Cl. ..................... 331/94.5 PE; 331/94.5 G; 331/94.5 P
[58] Field of Search ......... 331/94.5, 94.5 G, 94.5 PE, 331/94.5 P; 330/4.3

[56] References Cited

U.S. PATENT DOCUMENTS

| | | | |
|---|---|---|---|
| 3,314,021 | 4/1967 | Haun, Jr. et al. | 331/94.5 P |
| 3,842,366 | 10/1974 | Gordon | 331/94.5 |
| 3,864,643 | 2/1975 | Waynant | 331/94.5 PE |
| 3,900,803 | 8/1975 | Silfvast et al. | 331/94.5 P |

OTHER PUBLICATIONS

Bradley et al., Optics Communications, vol. 11, No. 4, Aug. 1974, pp. 335–338.
Patterson et al., Applied Physics Letters, vol. 21, No. 6, Sep. 15, 1972, pp. 293–295.
Searles et al., *Appl. Phys. Letters,* vol. 27, No. 4, 15 Aug. 1975, pp. 243–245.
Ault et al., *Appl. Phys. Lett.,* vol. 27, No. 7, 1 Oct. 1975, pp. 413–415.

*Primary Examiner*—Martin H. Edlow
*Attorney, Agent, or Firm*—Dean E. Carlson; Roger S. Gaither; John F. Schipper

[57] ABSTRACT

An electron beam of energy typically 100 keV excites a fluorescer gas which emits ultraviolet radiation. This radiation excites and drives an adjacent laser gas by optical pumping or photolytic dissociation to produce high efficiency pulses.

The invention described herein was made in the course of, or under, United States Energy Research and Development Administration Contract No. W-7405-Eng-48 with the University of California.

18 Claims, 11 Drawing Figures

METHOD AND APPARATUS FOR SECONDARY LASER PUMPING BY ELECTRON BEAM EXCITATION

FIELD OF THE INVENTION

This invention relates to gas lasers and more particularly, to gas lasers with primary and secondary pumping mechanisms.

BACKGROUND OF THE INVENTION

Recently, a number of new classes of molecules have been studied as short wavelength lasers, the reactions being driven by flash tubes and/or electron beams. These molecules have included many of the noble gas halides such as XeBr; the noble gas and halide molecules themselves, iodine-containing compounds such as $CF_3I$ and $C_3F_7I$; the column 6 excited elements such as $O(^1S_o)$ and $S(^1S_o)$; and a sub class of cyanogens including $CH_3CN$. All of these compounds respond as primary lasers, although the associated efficiencies are sometimes low. The pure noble gas, pure halides and noble gas-halide mixtures emit radiation at wavelengths of 1100–3400 A, which is substantially the same wavelength range at which the other molecules, such as $C_3F_7I$, $N_2O$ and $CH_3CN$ (which produce $I^*$, $O(^1S_o)$ and $CN^*$ or $CN^+$, respectively) absorb in undergoing laser action. The subject invention uses the fluorescence radiation of the noble gases and/or halides to photolytically drive these latter three classes of compounds, using primary and secondary pumping to achieve high efficiency laser action with potentially high energy storage capacity.

In U.S. Energy Research and Development Administration technical report No. UCRL-51455, there is considered the possibility of fabricating a high energy storage visible laser using the excited metastable $^1S_o$ - $^1D_2$ transition in oxygen and the other column 6 elements, sulfur, selenium, and tellurium. It was found that oxygen and other column 6 elements are most efficiently excited by photolysis, at partial pressures less than 100 torr, using 9.8 eV photons for $O(^1S_o)$ with lower energies sufficing for the higher atomic weight elements (e.g., 7.3 eV for $Se(^1S_o)$. The $^1S_o$ - $^1D_2$ transition in oxygen, for example, yields radiation of wavelength 5577 A, with somewhat longer associated wavelengths for the corresponding transition in the sulfur, selenium, and tellurium. Thus, the column 6 elements are good candidates for the laser gas if the secondary source can provide radiation of about 7–10 eV.

There have been experimental studies of the use of $Ar_2^*$ radiation to generate $O(^1S_o)$ by photodissociation of $NO_2$.

Another class of candidates for the laser gas is the cyanogens, especially $CH_3CN$, $HCN$, $ClCN$, $BrCN$, $ICN$, $CF_3CN$, $C_2F_5CN$ and $(CN)_2$, which have been shown to behave as photodissociation and predissociation chemical lasers by West and Berry in *Journal of Chem. Phys.*, Vol. 61, p. 4700 (Dec. 1974), and *Journal of Chem. Phys.*, Vol. 59, p. 6229 (Dec. 1973). Working at cyanogen partial pressures of 0.5–15 torr, West and Berry produced laser action by flash photolysis of the cyanogens at wavelengths greater than 1550 A. Thus, the abovementioned group of cyanogens will also work as laser gases, if pumped by an appropriate short wavelength source.

Flash photolysis ($\lambda$- 2680 A) laser action in $CH_3I$, $CF_3I$, $C_2F_5I$, $C_3F_7I$, and $C_4F_9I$ at 1–100 torr has been reported by Kasper et al in *Applied Physics Letters*, Vol. 5, p. 231 (December 1964) and in *Journal of Chemical Physics*, Vol. 43, p. 1827 (September 1965), where laser emission from excited iodine $I^*$ was found to extend over times of the order of 20 $\mu$sec, long after the flash lamp had peaked and declined. Gensel et al, in *Applied Physics Letters*, Vol. 18, p. 48 (January 1971), reported that application of an inhomogeneous magentic field along a laser tube containing $CF_3I$ results in Zeeman broadening of the spectral lines by an amount proportional to field strength B and results in an increase of laser energy storage capacity by perhaps 60% by limiting the onset of superfluorescence. Gensel et al also reported the existence of possible chemical pumping via reactions such as $CF_3 + CF_3I \rightarrow C_2F_6 + I^*$ which augments photolytic response. Zuev et al, in *Soviet Physics JETP*, Vol. 35, p. 870 (November 1972), and Alridge in *Applied Physics Letters*, Vol. 22, p. 180 (February 1973) and *I.E.E.E. Journal of Quantum Electronics*, p. 215 (May 1975), reported that addition of an inert buffer gas such as He or Ar to gases such as $CF_3I$ and $C_3F_7I$ results in homogeneous pressure broadening which lowers the stimulated emission cross section $o_e$ but leaves the inversion population density $\Delta n$ unchanged; this reduces the gain per round trip of the lasing medium and thus increases laser energy storage capacity. These results indicate that photolysis of $CH_3I$ and of $C_nF_{2n+1}I$ results in lasing action, and that laser energy storage density may be quantitatively controlled by increased buffering or by inhomogeneous magnetic fields.

Birich et al in *Soviet Physics:JETP Letters*, Vol. 19, p. 27 (January 1974) have replaced carbon in the $Se_2$ iodine compounds by the column 5 elements, phosphorous, arsenic and antimony, and have obtained laser action from the decay of $I^*$ in at least 16 compounds: $(CF_3)_2AsI$, $CF_3(C_2F_5)AsI$, $CF_3(C_3F_7)AsI$, $(C_2F_5)_2AsI$, $(C_3F_7)_2AsI$, $(CF_3)_2PI$, $CF_3(C_2F_5)PI$, $CF_3(C_3F_7)PI$, $(C_2F_5)_2PI$, $(C_3F_7)_2PI$, $CF_3(CH_3)PI$, $CF_3PI(CN)$, $CF_3(CF_2Cl)PI$, $F_3PI$, $OPF_2I$, and $(CF_3)SbI$. Birich et al find that, with the exception of $F_3PI$ and $OPF_2I$, the abovementioned column 5 compounds exhibit a two band absorption spectra, unlike the single band compounds $C_nF_{2n+1}I$ I and $CH_3I$, although absorption in only one band may be effective in producing $I^*$. For example, $(CF_3)_2AsI$ has absorption peaks at approximately $\lambda = 2200$ A and $\lambda = 2850$ A, while $CF_3I$ and $C_3F_7I$ have one such peak each at $\lambda = 2650$ A and $\lambda = 2760$ A, respectively: The absorption peaks of the column 5 compounds appear to bracket the single band compounds such as $C_nF_{2n+1}I$. A further difference was noted: n-$C_3F_7I$, as representative of a generic class of iodine compounds $CnF_{2n+1}I$, appears to degrade rather quickly through thermal decomposition, while compounds such as $(CF_3)_2AsI$ can withstand perhaps 25 lamp flashes with only a 25% reduction in laser output. This suggests that the column 5 iodine-containing compounds may be superior for purposes of repetitive pulsing by a fluorescent source.

The abovementioned laser candidates have been driven photolytically, and the subject invention accomplishes this by e-beam driven fluorescence in noble gas-halide mixture, in pure noble gases, in pure halide gases, and other fluorescers responsive to e-beam excitation.

Velazco and Setser, in *Journal of Chemical Physics*, Vol. 62, p. 1990 (1975), have studied bound-free and bound-bound emission spectra of excited xenon halides, which subsequently radiate to the dissociative or very weakly bound ground state (xenon + halide) with the emission of ultraviolet light ($\lambda \cong 3{,}000$ A). The compounds XeI*, XeBr*, XeCl*, and XeF* were studied and their emission spectra were determined. The 4–10 eV energy radiated in these transitions is appropriate for photolytically driving the various classes of laser gas of the subject invention.

Mangano and Jacob, of the Avco Everett Research Laboratory (28th Gaseous Electronics Conference Proceedings, Oct. 20 - 24, 1975, University of Missouri at Rolla) have studied electron beam discharge pumping of the KrF laser, using 98% Ar as a buffer in a 1 atm. mixture. Apparently rare gas metastable production fluorescence efficiency is about 50% with direct electron beam pumping against a possible 70% efficiency with discharge pumping. Finally, they find that if Kr* can be produced with 75% efficiency in a discharge, the possible laser efficiency of the e-beam driven KrF is 5–10%.

Hughes, Shannon and Hunter, in *Applied Physics Letters*, Vol. 24, p. 488 (May 1974) and Vol. 25, p. 86 (July 1974), have reported superfluorescence response from noble gases such as pure Xe and Ar as well as Xe-Ar and Xe-Ne mixtures, driven by an electron beam. Their calculations indicate a 1% conversion efficiency of the laser system, amounting to about 60 joules/liter radiation in the ultraviolet with their 800 keV e-beam input of 6 joules/cm$^3$ and 300 amps/cm$^2$. This superfluorescent radiation is also appropriate for photolytically driving a secondary laser cell.

The emission spectrum of XeI* in e-beam excited Xe/I$_2$ mixtures has been reported by Ewing and Brau, *Physical Review A*, Vol. 12, p. 12 (July 1975). The mixture of Xe and I$_2$ with an Ar buffer was irradiated with a 400 keV electron beam, which causes a recombination of Xe and I into bound excited states on a time scale of nanoseconds. The radiation observed is believed to arise from decay of XeI*($^2\Sigma$), resulting in emission of a 2560 A photon. This radiation, again, is in the appropriate range for driving the laser gas, as discussed above.

Finally, Searles and Hart, In *Applied Physics Letters*, Vol. 27, p. 243 (August 1975), have reported laser emission at 2818 A from XeBr* directly driven by an e-beam, the laser radiation coming from decay of the XeBr* molecule. E-beam energy reported was in excess of 400 keV, and total pressure used was about 5000 torr. The Searles and Hart system, of course, was concerned with direct e-beam driving of the fluorescer gas of the subject invention, for purposes of laser action.

The foregoing results indicate that: (1) an e-beam may be used to drive a substance such as a rare gas halide or a pure noble gas or halide gas with the emission of ultraviolet radiation: (2) the e-beam pumping may achieve laser efficiencies of 5 – 10%, with the prospect of higher fluorescer efficiencies; and (3) ultraviolet radiation may be used to pump, for purposes of lasing action, classes of compounds including the column 6 elements, the cyanogens, and certain iodine-containing compounds, such as CF$_3$I and (CF$_3$)$_2$AsI.

SUMMARY OF THE INVENTION

Accordingly, it is an object of the subject invention to provide a method and apparatus for primary and secondary pumping of a laser gas by an e-beam, the apparatus comprising an e-beam diode consisting of a cathode and an anode, the anode being a thin foil; a reservoir of electrons for the e-beam; a fluorescer gas driven by the e-beam; fluorescer gas container means which transmits energetic electrons; a second gas which may be stimulated to emit laser radiation in response to fluorescent radiation received from the fluorescer gas; and laser gas container means separating the fluorescer gas and the e-beam electrons from the laser gas, which containr means is sufficiently transparent to the fluorescence radiation.

The method of the subject invention comprises exciting a fluorescer gas by a particle beam, passing the fluorescence radiation through the transparent walls of a container containing a laser gas responsive to the wavelength of the incident radiation, and allowing the laser gas to radiate substantially monochromatically.

Other objects, features, and advantages of the subject invention will become apparent by reference to the following drawings and detailed description.

DESCRIPTION OF THE PREFERRED EMBODIMENT

The use of an electron beam machine to drive a gas laser is an attractive notion, offering the possibility of efficiencies which may be one or more orders of magnitude higher than efficiencies of conventionally driven gas lasers and the possibility of very rapid pumping. One immediate problem arises, however, in that if the electrons are directly incident upon the laser gas, the electrons can both excite the gas and subsequently quench the laser response by well known reactions. The subject invention avoids this problem by interposing a secondary pumping source, a fluorescer gas which absorbs the e-beam electrons and emits narrow bandwidth, ultraviolet radiation coherently or incoherently, which radiation is used to drive an adjacent laser gas, separated from the fluorescer or secondary source by an optical window, by optical pumping or by photolytic dissociation of the laser gas molecules. The electrons incident upon the secondary source are thus effectively separated from the laser gas itself, and the aforementioned quenching reactions do not arise.

The subject invention is a high efficiency laser system employing primary e-beam pumping and secondary fluorescer gas pumping, which system may be modified to also produce a laser capable of high energy storage density. Such a laser system has utility in fields where high laser efficiency is a requirement.

Figure 1:
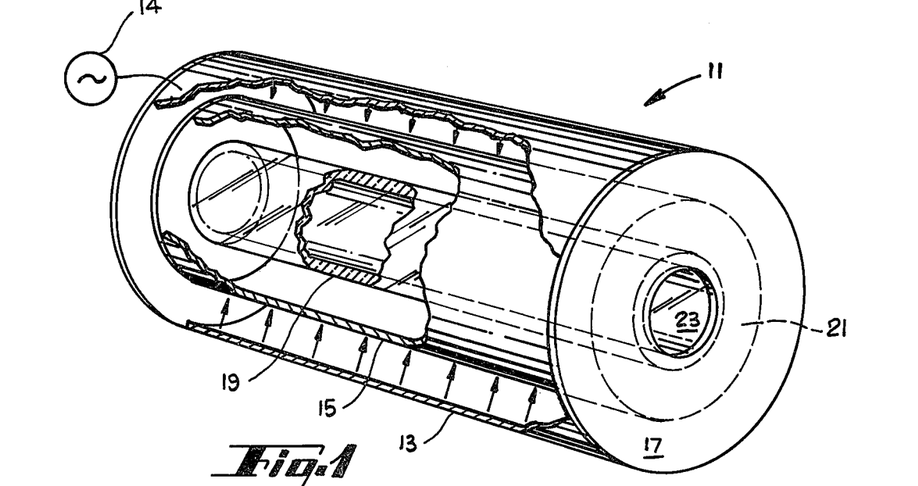
FIG. 1 exhibits one embodiment of the subject invention, utilizing a cylindrical geometry for cathode, anode, and laser tube.

Referring more particularly to FIG. 1, the cylindrical laser system 11 includes an outer cylindrical e-beam cathode 13, which is coaxial with and contains a cylindrical e-beam anode 15 in the form of a thin foil. The annular region 17 between cathode 13 and anode 15 is maintained at a vacuum so as not to interfere with the transport of electrons accelerated by the e-beam device.

The cylindrical anode 15 is in turn coaxial with and surrounds a laser tube 19 composed of material transparent to visible and ultraviolet wavelength radiation down to perhaps $\lambda = 1,100$ A. If one works only with radiation of wavelengths greater than, say, 2,000 A, the laser tube may be constructed of quartz or ordinary glass. However, if the wavelength region $\lambda = 1100-2000$ A is also to be utilized, the laser tube must be constructed of another material such as lithium fluoride or magnesium fluoride which is transparent to radiation of such wavelengths. One's choice of laser tube material is controlled by one's choice of the fluorescer gas to be used.

The annular region 21 lying between the anode 15 and the laser tube 19 contains a gas mixture comprising noble gaes and halogen-containing gases such as Ar, Xe and $Br_2$ which are capable of fluorescence by e-beam excitation. After the electrons are accelerated by the e-beam device, they pass through the thin foil anode 15, and interact with the fluorescer gas contained in the annular region 21.

Nearly all of the resulting fluorescent radiation passes through the transparent laser tube 19 and excites an appropriately chosen laser gas contained in the cylindrical region 23 within the tube. Said laser gas may be chosen from any of four chemical groups: the group consisting of $CH_3I$, $CF_3I$, $C_2F_6I$, $C_3F_7I$, and $C_4F_9I$, maintained at a partial pressure of 1-100 torr; the iodine-containing "column 5 compounds" such as $(CF_3)_2AsI$ studied by Birich et al, maintained at a partial pressure of 1-100 torr; the group consisting of $CO_2$, OCS, OCSe, $OCTe_2$, $CS_2$, $CSe_2$, $NO_2$ and $N_2O$, maintained at a partial pressure of 1-50 torr; and the group consisting of $CH_3CN$, $CF_3CN$, $C_2F_5CN$, BrCN, and $(CN)_2$, maintained at a partial pressure of ½-15 torr. These groups of molecules, as well as possibly others drawn from the same columns in the periodic table, are capable of laser action when excited by ultraviolet light of appropriate wavelength ($\lambda = 1000-3600A$). The molecules drawn from these groups undergo photolytically-driven dissociation reactions such as, $CF_3I + h\nu (\lambda \simeq 2818 A) \rightarrow CF_3 + I^* \rightarrow CF_3 + I + h\nu' (13,150 A)$, $N_2O + h\nu (\lambda \simeq 1300 A) \rightarrow N_2 + O(^1S_o) \rightarrow N_2 + O(^1D_2) + h\nu'(5577 A)$, $CH_3CN + h\nu (\lambda \simeq 2000 A) \rightarrow CH_3 + CN^* \rightarrow CH_3CN + h\nu'(11,000 A)$ in response to the incident ultraviolet radiation, producing in turn potential laser radiation of wavelengths in the range $\lambda = 4500-53,000$ A. The details of these reactions are discussed below.

The system may be operated in an optical cavity, in which case it functions as a conventional laser, or it may be operated as a simple power amplifier without the usual double mirror arrangement. In this latter mode of operation, the energy is stored in the upper states of the secondary laser material for subsequent removal by and amplification of a pulse of appropriate wavelength.

The subject invention thus uses an electron beam device for primary pumping of a fluorescer gas, the fluorescer gas in turn acting as a secondary pumping source for the laser gas of interest. A realistic upper bound on electron beam excitation efficiency appears to be 50% from the wall plug, the beam exciting a 20-40% efficient fluorescer gas which dissociates the adjacent laser gas with nearly 100% efficiency. Finally, the excited state energy may be extracted from the laser at a maximum of about 50% efficiency, and the quantum yield (wavelength of fluorescer radiation divided by wavelength of laser radiation) is 20-40%. Thus, the overall efficiency of the system is approximately 2 - 4%.

Figures 2, 3:
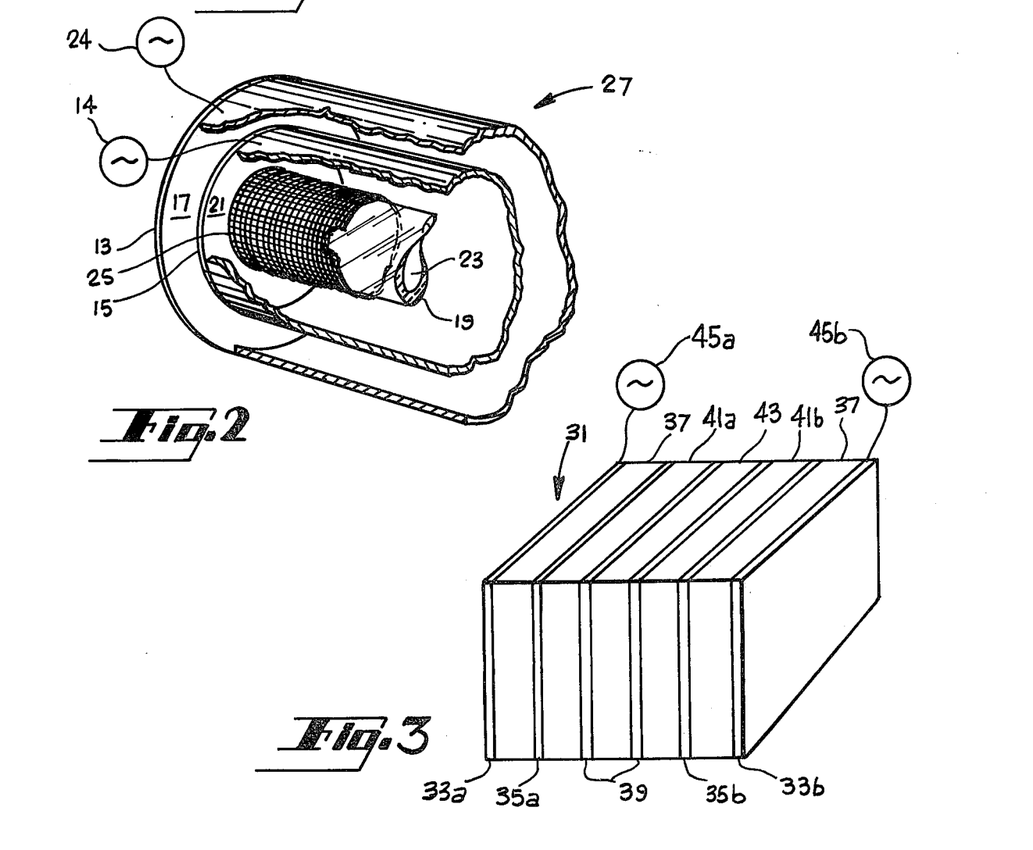
FIG. 2, also exhibiting a cylindrical geometry embodiment, includes a secondary cathode and secondary anode for operation in a sustainer mode.
FIG. 3 is a perspective view showing a third embodiment of the subject invention in a planar or slab geometry.

FIG. 2 exhibits an alternative embodiment 27 of the subject invention, which may be operated in the electron beam sustained discharge mode (sustainer mode). A secondary supply 14 of electrons is made availble at the anode 15, and a cylindrical mesh 25 surrounds and is adjacent to and coaxial with the laser tube 19. The mesh 25 is maintained at a positive potential (−10 keV) relative to the cylindrical foil and primary anode 15 so that said foil acts as a secondary cathode with the mesh as secondary anode. The secondary anode 25 and secondary cathode 15 provide a sustainer current of at least 1 amp/cm² in the annular region 21′ between the anode-secondary cathode 15 and the mesh 25. This sustainer current, operating at a reduced potential of perhaps 10 keV, acts to drive the fluorescer system in synchronism with the primary cathode 13; operated in this mode, the primary cathode potential may be reduced to perhaps 10 keV also.

A third embodiment, utilizing a planar or slab geometry, is shown in FIG. 3. The slab cellular device 31 is bounded by two parallel plates 33a and 33b which function as cathodes; the cathodes may operate from a common electron supply, or may be fed by independent reservoirs 45a and 45b as suggested in FIG. 3. A pair of planar thin foil anodes 35a and 35b is located between the parallel plate cathodes 33a and 33b in parallel relationship thereto as shown; the rectangular space 37 between each cathode 33 and its adjacent anode 35 is maintained at a vacuum as before. A pair of plates 39, composed material transparent to the fluorescence radiation, is located between the thin foils 35 and in parallel relationship thereto. The rectangular space 41 between each anode 35 and its adjacent transparent plate 39 is filled with a fluorescer gas of the same composition as that contained in the annular cavity 21 in FIG. 1. The entire device is sealed on all sides. The two transparent plates 39 act to contain a laser gas in the rectangular cavity 43 therebetween, analogous to the laser tube 19 which contains a laser gas in the cylindrical cavity 23 in FIG. 1.

The embodiment of FIG. 3 may operate in a coordinated mode, whereby the two cathodes 33a and 33b are pulsed synchronously so that the fluorescer gas in each of the cavities 41a and 41b is excited synchronously. This appears to afford greater uniformity and fluorescer intensity in that the laser gas contained in the cavity 43 is simultaneously excited by fluorescence radiation incident on each side of said cavity. An alternative tandem mode of operation would excite each of the plane parallel cathodes 33a and 33b at different times so that the laser gas contained in the cavity 43 is excited approximately twice as often by the fluorescent radiation. What one loses in uniformity and fluorescer intensity in this tandem mode might be more than compensated by the more frequent laser pulses delivered by the gas in the cavity 43.

The first experiments on the subject invention have utilized the plane or slab geometry, with no attempt being made to optimize optical coupling. The system produced laser action as expected, and the measured fluorescence efficiency was 11%. Of course, the slab geometry embodiment may also be operated in the sustainer mode, with a mesh located adjacent to and parallel to each transparent plate 39 between said plate and its adjacent anode 35 (which then also functions as a secondary cathode).

A fourth embodiment utilizes a special subclass of fluorescent gases responsive to e-beam excitation, viz. those gases (such as KrF, Xe, Kr and possibly Ar) which have optical gain themselves; sufficiently high that two, one or no mirrors may be used to produce emission preferentially directed along the tube axis. This superfluorescence or laser emission is used to drive the secondary laser cell.

Figure 11:
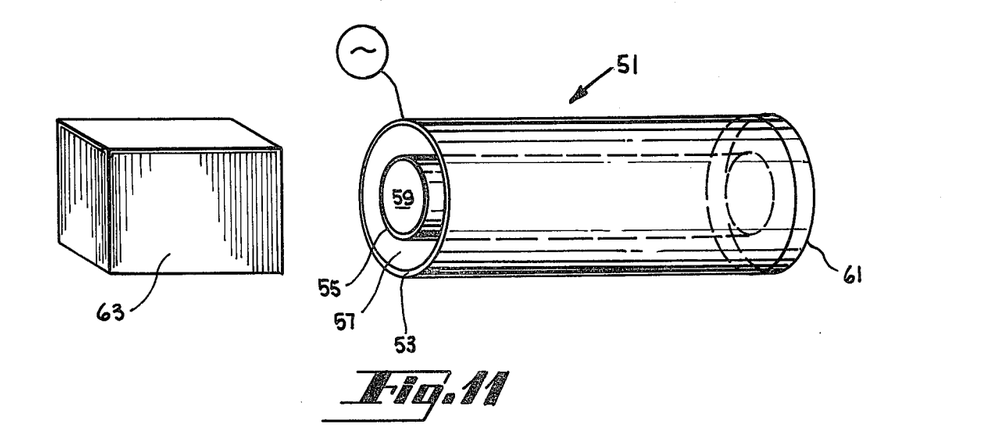
FIG. 11 is a perspective view of a fourth embodiment, wherein the fluorescer material is a superfluorescent gas used to drive a secondary laser cell.

The fourth embodiment, shown in FIG. 11, adopts this approach. The first component 51 comprises a cylindrical cathode 53, with a supply of electrons, surrounding a cylindrical thin foil anode 55, the annular region 57 between cathode and anode being maintained at a vacuum by seals (not shown) at each end of the entire component. The cylindrical interior 59 of the anode 55 contains a superfluorescer gas such as KrF, Xe, Kr or possibly Ar resonsive to 3-beam excitation. One end of the first component 61 contains a transversely oriented mirror with maximum reflectivity at a wavelength substantially matching the superfluorescence radiation wavelength. The second end of the first component is adjacent to and oriented toward a container 63 filled with a suitable laser gas such as CF₃I, N₂O or CH₃CN which has an absorption band approximately coincident with an emission band of the superfluorescer gas contained in 59. The e-beam drives the superfluorescer which undergoes laser action and photolytically drives the laser gas contained in 63. The container 63 is shown only schematically here. The container may be fitted with its own double mirror arrangement so that it functions as a laser optical cavity for the gas contained therein; or the container and gas may function as a simple power amplifier (no mirrors included) via storage of energy in the appropriate upper levels of the gas.

The annular region 21 lying between the anode 15 and the laser tube 19 contains a noble gas buffer such as Ar and a fluorescer gas mixture such as Xe/Br₂, or more generally No/Ha₂ or Ha₂ or No (No = noble gas, Ha = halide), which is capable of fluorescence by e-beam excitation. As the electrons are accelerated by the e-beam device, they pass through the thin foil anode 15, losing some energy in the process, and interact with the fluorescer gas contained in the annular region 21.

Choosing Xe/Br₂ as an example, the following reaction channels are believed to be utilized in the fluorescence process:

Noble gases such as Ar follow processes such as and the halides Ha₂ follow similar routes in fluorescing, with associated fluorescent wavelengths somewhat higher than those for NoHa (for example, $\lambda(Br_2^*) \simeq 2914$ Å). The following gases are useful in producing fluorescence radiation by photolysis or by e-beam excitation:

This list is not intended to be exhaustive; it merely includes those gases of the form NoHa, No or Ha₂ which fluoresces in a laser environment by photolysis or by e-beam excitation.

The first fluorescence experiments directed toward establishing feasibility of the subject invention used Ar (1–5 atm), Xe (5–50 torr) and Br₂ (at most 2 torr) contained by a 0.012 mm thick polypyromellitimide foil overlying a 0.025 mm thick titanium foil. The titanium provides structural strength and a conducting surface to inhibit charge buildup, and the polypyromellitimide protects the titanium from corrosion by halogens such as bromine. The first experiments used a one-sided version of the embodiment of FIG. 3, admittedly less efficient, wherein a single "slab" container for the fluorescer gas lies adjacent to a quartz tube containing the laser gas. The fluorescer gas volume was 100 liters, and the illuminated portion of the laser tube was 1 meter long with an inside diameter of 9 mm.

The electron beam was generated by a two-stage, 130 keV Marx generator bank connected to a 100 cm × 10 cm cold blade cathode (33a in FIG. 3). Accounting for transmission losses, the machine delivers 210 keV at a current density of 1–3 amps/cm$^2$ with a pulse duration of approximately 1 $\mu$sec.

For purposes of efficiency measurements, a photodiode with a response of 76 milliamps/watt at $\lambda = 2800$ A was placed in and at the edge of the fluorescer cell at a mid-plane position. The first measured fluorescer efficiency was 11%, compared with the theoretical maximum of around 30% for XBr.

Figure 8:
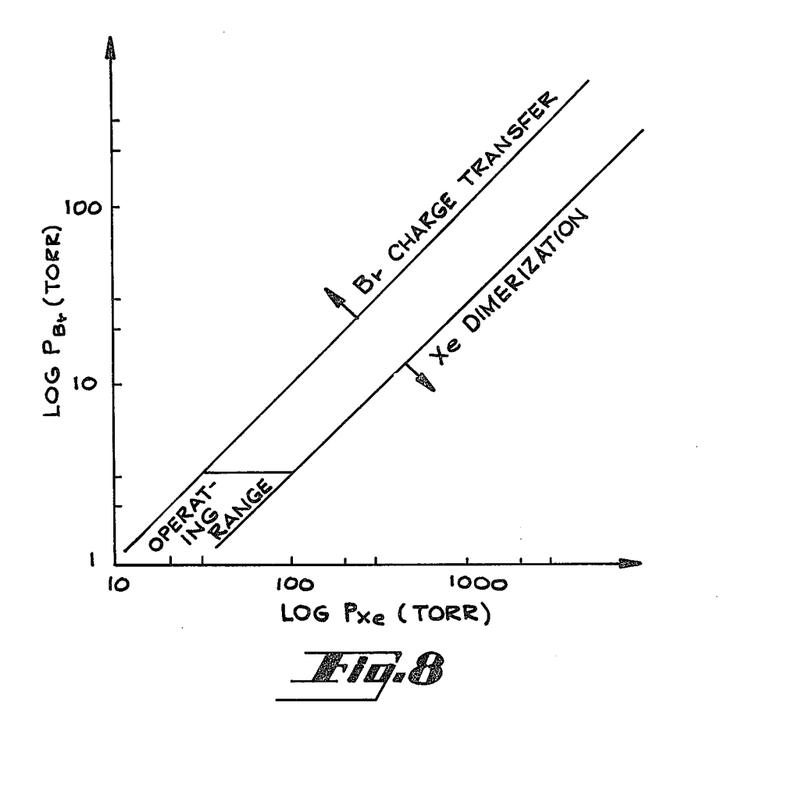
FIG. 8 discloses the operating range of pressures of Xe and Br gases in XeBr* fluorescence.
Figure 10:
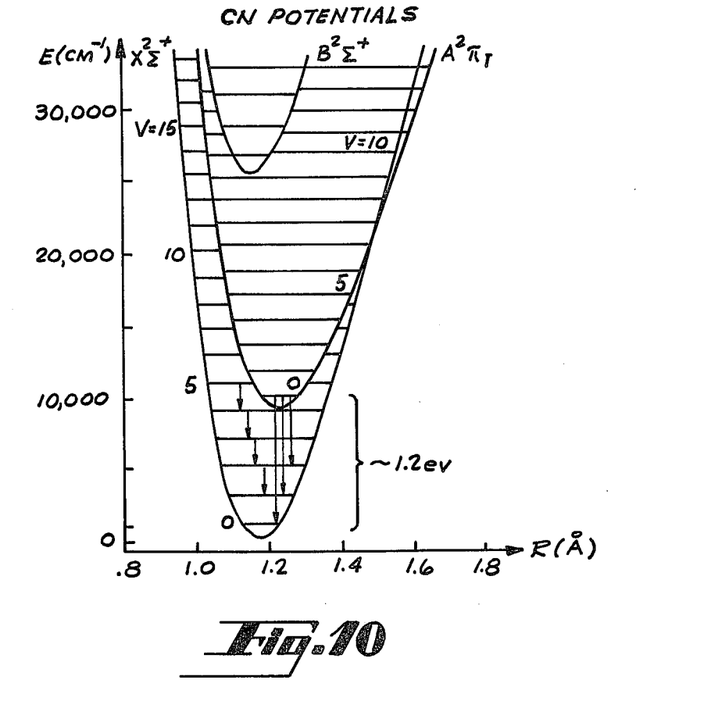
FIG. 10 exhibits potential energy curves and some of the relevent transitions for the cyanide radical CN.

Determination of emission spectra produced a narrow peak (FWHM $\Delta\lambda \simeq 150$ A) due to a bound-weakly bound transition in XeBr* at $\lambda = 2818$ A, a second narrow peak due to Br$_2$* at $\lambda = 2914$ A and a diffuse continuum centered approximately at $\lambda = 3254$ A which is attributed to a bound-free transition in XeBr* The lower two peaks are shown, somewhat schematically, in FIG. 10. With respect to efficiency of the lower XeBr* band, the optimum partial pressures appear to be Ar : Xe : Br = 2 atm. : 25 torr : 1 torr. A rationale for the appearance of optimum partial pressures is as follows. A certain minimum density of Xe must be maintained to efficiently quench Ar* and Ar$_2$* via the aforementioned reactions. However, an excess of Xe will drive the competing dimerization channel representing a loss to the system. The operable range of partial pressure for Xe is apparently 5–50 torr. A certain minimum Br$_2$ density must be extant if the reaction Xe* + Br$_2 \rightarrow$ XeBr* + Br is to occur; the presence of excess Br$_2$ will drive the charge transfer reaction which interrupts one of the channel reactions producing XeBr* The limitations on Br$_2$ partial pressure appear to be twofold: (1) Br$_2$ conc. < 0.1 Xe conc. to avoid direct Ar$_2$ deactivation by Br$_2$; and (2) Br$_2$ conc. < 2 torr to avoid interruption of the Ar ionization channel by charge transfer to Br$_2$. The required partial pressure ranges of Xe and Br$_2$ are schematically suggested in FIG. 8.

Figure 4:
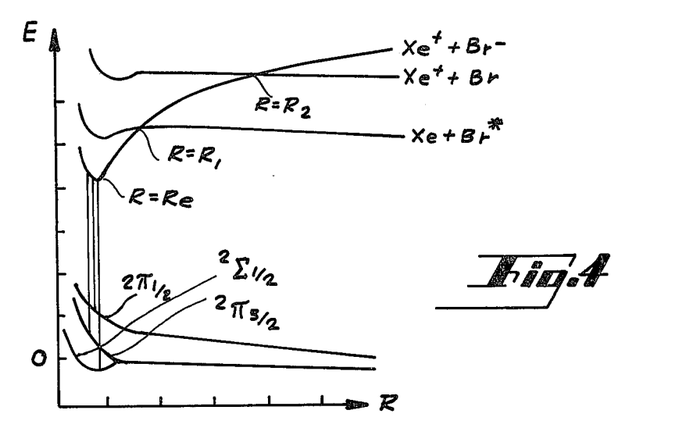
FIG. 4 exhibits potential energy curves for one of the fluorescer gas combinations of interest, showing the fluorescer emission lines which act as a secondary pumping source.

FIG. 4 indicates some of the channels available to XeBr in the final reaction. According to the present understanding, XeBr* may be formed by the coalescence of Xe$^+$ and Br$^-$ or of Xe and Br* or of Xe* and Br, for example. XeBr* then decays into either the $^2\Sigma_{\frac{1}{2}}$ state with emission at $\lambda = 2818$ A or into the $^2\pi_{3/2}$ or $^2\pi_{\frac{1}{2}}$ state with emission at $\lambda \simeq 3254$ A.

Figure 7:
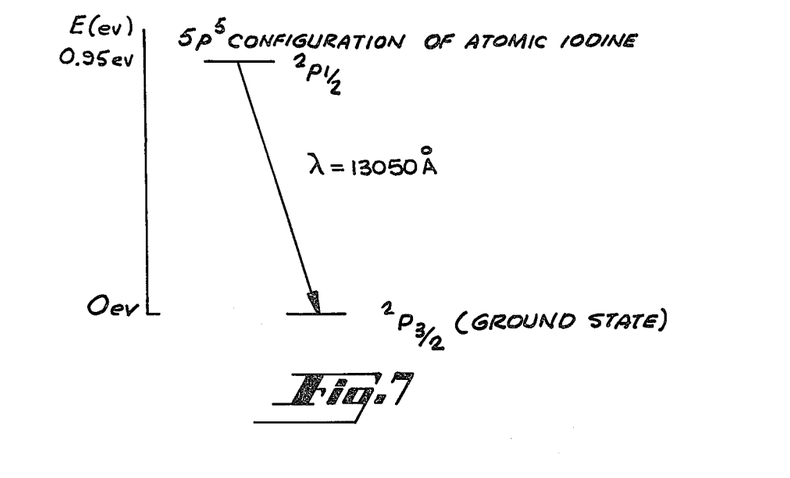
FIG. 7 exhibits the energy levels involved in de-excitation of atomic iodine as might be produced in photolysis of CH$_3$I or C$_n$F$_{2n+1}$I.
Figure 9:
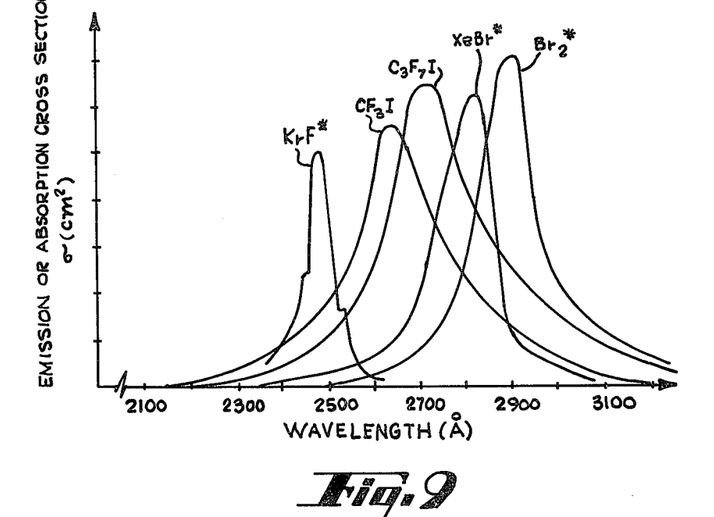
FIG. 9 exhibits the emission spectra of the fluorescers KrF*, XeBr* and Br$_2$* and the corresponding absorption spectra of the laser materials CF$_3$I and C$_3$F$_7$I.

In the first experiments, C$_3$F$_7$I at 100 torr was used as the laser gas, although it is clear from the results of Kasper et al and Gensel et al, supra, that CH$_3$I, CF$_3$I, C$_2$F$_5$I and C$_4$F$_9$I will also respond to fluorescent radiation and will lase. FIG. 9 exhibits schematically the cross sections for stimulated emission of three candidate fluorescers KrF* XeBr* and Br$_2$* and the absorption cross sections for two candidate laser materials CF$_3$I and C$_3$F$_7$I. The absorption cross sections of CF$_3$I and C$_3$F$_7$I are broad enough that any of the three candidate fluorescers shown, among others, may drive the system; the cross section peaks need not be coincident, although system efficiency degrades as the fluorescer peak moves away from the laser peak. Laser action in atomic iodine proceeds according to reactions such as or and the final radiative transition I($^2$P$_{\frac{1}{2}}$)* $\rightarrow$ I($^2$P$_{3/2}$) is indicated in FIG. 7. A laser gain of 1% per meter requires an upper state ($^2$P$_{\frac{1}{2}}$) population of at least 2 × 10$^{14}$ cm$^{-3}$, requiring a pumping flux of 6 watts/cm$^2$ through the laser tube. In practice, one easily attains upper state concentrations considerably in excess of this. The first feasibility experiments used a conventional optical cavity defined by two 99.9% reflectivity mirrors (of 5 and 10 meters radius, respectively), transversely positioned adjacent to and outside of the laser tube at each end thereof (not shown in FIGS. 1–3). The mirror coatings were chosen for maximum reflectivity at $\lambda = 13,000$ A; and the first experiments yielded laser energy output of about 120 microjoules, a low value which can be improved by optimization of the system. The stimulated emission cross section ($\sigma \simeq 2 \times 10^{-18}$ cm$^2$) is higher than desirable for efficient energy storage, but as shown by Gensel et al, Zuev et al and Aldridge, supra, iodine laser energy storage can be increased by imposition of an inhomogeneous magnetic field or, preferably, by pressure broadening.

Evidently, the abovementioned column 5 compounds, such as (CF$_3$)$_2$AsI, studied by Birich et al, supra, may also be used as the laser medium in place of CH$_3$I or C$_n$F$_{2n+1}$I. As noted above, the column 5 compounds may offer the advantage of a double absorption peak which allows easier matching of excimer radiation bands to the laser absorption bands. Some of these compounds appear to be more resistant to thermal decomposition under repetitive pulsing than is a compound such as n - C$_3$F$_7$I.

Figure 5:
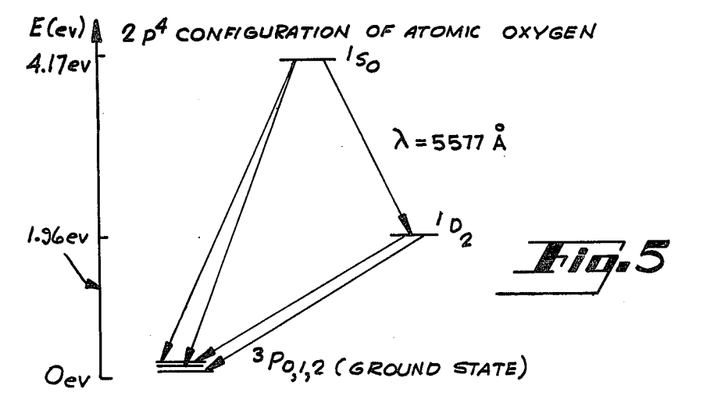
FIG. 5 exhibits the relevant energy levels involved in transitions from the singlet S and singlet D states of atomic oxygen to the ground state, such levels being representative of the class of transitions of the column 6 elements.

A second series of experiments has demonstrated the high energy storage potential of lasers involving the $^1$S$_o$ - $^1$D$_2$ transition at 1–100 torr in oxygen shown in FIG. 5, and more generally in the column 6 elements such as O, S, Se and Te. The host laser materials considered include N$_2$O, NO$_2$, CO$_2$, OCS, OCSe, OCTe, CS$_2$ and CSe$_2$. Such laser materials offer the following desirable characteristics: (1) the stimulated emission cross section ($\sigma \simeq 10^{-20}$ cm$^2$) is low enough to avoid superfluorescence, which minimizes upper state depopulation, but large enough that the saturation flux is less than the optical breakdown threshold of the active medium and of the optics; (2) the emission wavelength lies in the visible or near infrared; (3) energy storage at high excited state densities (10–100 joules/liter) is possible, except perhaps with the cyanogens.

An example of such a line is the auroral line of atomic oxygen O($^1$S$_o$) $\rightarrow$ O($^1$D$_2$), which has a stimulated emission cross section $\sigma \simeq 9 \times 10^{-20}$ cm$^2$ under Doppler broadened conditions with radiation at λ = 5577 A, a saturation energy flux of 4 joules/cm² and a low probability of collisional deactivation. The energy is stored in a single atomic state and is therefore available for efficient picosecond pulse extraction. Both the $O(^1S_o)$ and $O(^1D_2)$ states are radiatively metastable, although the latter is much less stable to collisional deactivation. $O(^1S_o)$ and $O(^1D_2)$ states form excimer molecules with the noble gases and with $N_2$, NO, CO and similar molecules at partial pressures of about 1–100 torr, in a ½ – 5 atmosphere buffer gas, according to reactions such as $$N + N + O(^1S_o) \to N_2 + O(^1S_o)^* \to N_2 + O(^1D_2)^* + h\nu \, (5577 \, A)$$

Photolysis may be used to populate the upper state for the $^1S_o$ - $^1D_2$ transition, by reactions such as $$CO_2 + h\nu \, (\lambda < 1150 \, A) \to CO + O(^1S_o),$$

$$N_2O + h\nu \, (\lambda < 2100 \, A) \to N_2 + O(^1S_o),$$

$$NO_2 + h\nu \, (\lambda < 1720 \, A) \to NO + O(^1S_o),$$

$$ClO_2 + h\nu \, (\lambda < 1860 \, A) \to ClO + O(^1S_o).$$

Figure 6:
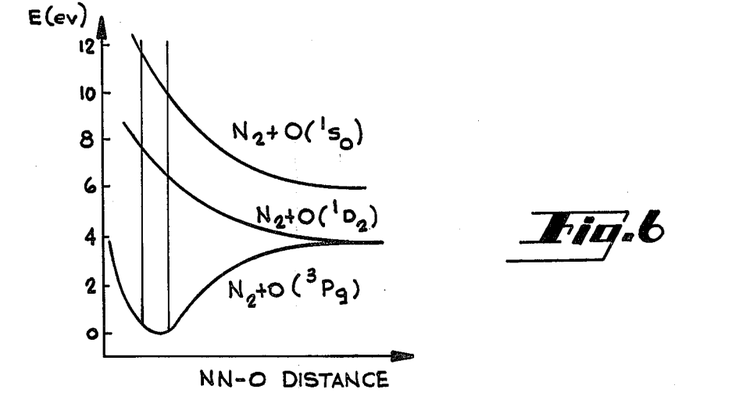
FIG. 6 exhibits potential energy curves for the transition of FIG. 5 in the class of compounds such as N$_2$O.

The first two of these reactions are known to have a high yield of $O(^1S_o)$. The usual problem with photolytic reactions, that energy-expensive photons must first be generated, is minimized in the subject invention by the cheaper production of e-beam particles and the use of an intermediary, a high efficiency, narrow band fluorescer which drives the photolysis or optically pumps the secondary laser cell. FIG. 6 exhibits the potential curves and associated photolytic reaction in $N_2O$ to produce $O(^1S_o)$. Light of appropriate wavelength (λ ≃ 1400 A) drives $N_2O$ from the ground state to the repulsive state $N_2 + O(^1S_o)$ which then decays to $N_2 + O(^1D_2)$ as shown. Theoretically, the $N_2O$ reaction may be driven by radiation with λ<2100 A. In practice, wavelengths λ<1470 A appear to be required, with $Ar_2^*$ radiation (λ<1260 A) producing the best response. The $NO_2$ and $ClO_2$ reactions may be driven photolytically by radiative decay from $Ar_2^*$, $Kr_2^*$ or $Xe_2^*$. The $NO_2$ reaction may be driven by $Ar_2^*$ or possibly $Ne_2^*$, while only $Ne_2^*$ radiation among the noble gases can be used to photolytically drive the $CO_2$ reaction.

The $^1S_o$-$^1D_2$ transition in sulfur differs substantially from that in oxygen in that: (1) laser gain is perhaps 20 times as large since the stimulated emission cross section is larger ($\sigma \simeq 4.5 \times 10^{-19}$ cm²), which may reduce energy storage capacity somewhat; (2) the inversion lifetime for $S(^1S_o)$ is ≃ 10 microseconds, which ameliorates the inversion density limits extant in a system with a shorter lifetime such as $Ar_2^*/N_2O$; and (3) radiant output is at λ = 7727 A. However, sulfur also offers the transauroral transition $S(^1S_o)$ - $S(^3p_1)$ with λ = 4591 A and $\sigma \simeq 3 \times 10^{-20}$ cm² and unknown depopulation characteristics. Sources of the upper state $S(^1S_o)$ are photolytic reactions such as $$OCS + h\nu \, (\lambda < 1470 \, A) \to CO + S(^1S_o)$$

$$CS_2 + h\nu \, (\lambda < 1900 \, A) \to CS + S(^1S_o)$$

The compounds OCSe and OCTe are natural choices as sources, respectively, for $Se(^1S_o)$ and $Te(^1S_o)$. The corresponding wavelengths for the $^1S_o$ - $^1D_2$ transitions lie in the mid-infrared, and a more interesting choice is the $^1S_o$ - $^3p_g$ transitions for Se and Te. The photolytic reaction $$OCSe + h\nu \, (\lambda < 1700 \, A) \to OC + Se(^1S_o)$$

is known to have a high yield of $Se(^1S_o)$, and the $Xe_2^*$ radiation is well suited to drive this reaction.

A third class of laser materials is a subclass of the cyanogens including $CH_3CN$, HCN, $CF_3CN$, $C_2F_5CN$, ClCN, BrCN, ICN and $(CN)_2$, maintained at total pressures of 10–50 torr, which were first studied by West and Berry, supra. Flash photolysis at λ≃2000 A drives the system by molecular electronic transitions such as $$RCN + 0 \, h\nu \, (\lambda > 1550 \, A) \to R + CN(A \, ^2\pi_{3/2}, v' = 0)^* \to$$

$$R + CN(X \, ^2\Sigma^+, v'' = 0 - 2) + h\nu' \, (\lambda \simeq 10,990 \, A, 14,200 \, A, 19,900 \, A)$$

and by vibrational transitions such as $$RCN + h\nu \, (\lambda > 1550 \, A) \to R + CN(A^2\pi_{3/2}, v' = n; n = 5,4,3,2)^+ \to$$

$$R + CN(X \, ^2\Sigma^+, v'' = n - 1) + h\nu' \, (\lambda \simeq 50,600 \, A, 51,000 \, A, 51,500 \, A, 52,500 \, A)$$

FIG. 10 indicates the CN potential curves and some of the final transitions responsible for laser action.

Of the cyanogen compounds considered, $CH_3CN$ appears to yield the most intense electronic transition (CN*) emission, lasting about 6 microseconds; laser emission from the remaining compounds lasts about 3 microseconds and is about ¼ as intense. The electronic transitions may be driven by a flash energy input of 1700 joules at partial pressures of 1–10 torr RCN (R = $CH_3$, H, $CF_3$, $C_2F_5$, Br, CN) in the presence of an Ar buffer at 20–50 torr.

The vibrational transition (CN⁺) emissions all occur nearly optimally at pressures of 10–40 torr with RCN at a partial pressure of 10 torr in the presence of an Ar buffer. However, the responsive class of radicals R is somewhat different: $CF_3CN$, $C_2F_5CN$, ClCN, BrCN, ICN and $CN_2$ undergo laser action via vibrational transitions, but $CH_3CN$ and HCN do not. This may be due to the presence of competing exchange and abstraction reactions such as $$CN^+ + HCN \to H + (CN)_2,$$

$$CN^+ + CH_3CN \to HCN + CH_2CN,$$

as suggested by West and Berry, supra. $(CN)_2$ and $CF_3CN$ emit most intensely here, the emission having a long tail and extending over about 12 microseconds; the remaining cyanogen compounds emit over an interval of 4–8 microseconds.

The CN* transitions are sensitive to partial pressure of the parent compound RCN and are most intense at 0.5–2 torr. At higher pressures (>1 torr for BrCN, >5 torr for HCN and $(CN)_2$, and >15 torr for $CF_3CN$ and $C_2F_5CN$), CN* emission is effectively quenched. $CH_3CN$ is an exception, with emission intensity which continues to increase as partial pressure increases up to 5 torr. By contrast, all CN⁺ emissions increase as the partial pressure of the parent compound RCN increases, up to the optimal partial pressures of about 10 torr.

Replacement of the Ar buffer in the systems $(CN)_2$ and $CF_3CN$ by Kr or by Xe causes the ratio of intensities $I_{CN}*/I_{CN+}$ to drop from ~1 in Ar to ~0.5 in Kr to ~0 in Xe, although the total laser emission $1_{CN}* + I_{CN+}$ remains approximately constant.

It is worth noting that many of the noble gas halide gases such as XeBr, although they may be made to lase, are of little use per se as high energy storage lasers. XeBr*, for example, has a radiative lifetime of about 2 × 10⁻⁸ seconds, too short to allow substantial population inversion when operated in a laser mode. However, these materials may be operated as incoherent fluorescers with efficiencies as high as 20-40% when excited by electron beams. The ultraviolet radiation thus produced is then used to photolyze an adjacent separately contained laser gas with high energy storage potential, and the overall efficiency of the system remains relatively high.

Although the best modes contemplated for practicing the subject invention have been shown and described herein, it will be apparent that modification and variation may be made without departing from what is regarded to be the subject matter of the invention.

We claim:

1. Apparatus for producing substantially monochromatic radiation by action of an electron beam, the apparatus comprising:
   a source of electrons;
   a cathode for accelerating the electrons, operatively associated with the source;
   an anode adjacent to but spaced from the cathode, the anode being capable of transmitting highly energetic electrons;
   a fluorescer gas, present at a partial pressure of at most 50 torr, containing buffering molecules and containing molecules capable of fluorescence in a narrow band with FWHM no more than 250 A near a frequency $\nu_1$, in the ultraviolet region of the electromagnetic spectrum below 2500 A through excitation by energetic electrons incident upon the gas, adjacent to the anode and insulated from contact with the cathode;
   first container means, operatively associated with the anode, for containing the fluorescer gas;
   a second gas, containing buffering molecules and containing molecules capable of being photolytically dissociated to form an excited species in response to incident ultraviolet radiation from the fluorescer gas, which will emit substantially monochromatic radiation near frequency $\nu_2$; and
   second container means, adjacent to but spaced from the anode, for separating the second gas from the fluorescer gas and the accelerated electrons, which means is substantially transparent to the fluorescence radiation, whereby the second gas emits substantially monochromatic radiation near frequency $\nu_2$ in a chosen direction.

2. Apparatus according to claim 1 wherein said anode is a thin foil.

3. Apparatus according to claim 1 wherein said cathode is substantially a hollow cylinder, said anode is substantially a hollow cylinder contained within the cathode, and said second container means is substantially a hollow cylinder contained within the anode.

4. Apparatus according to claim 1 wherein said cathode is substantially planar, said anode is substantially planar and parallel to said cathode, and said anode is positioned between said cathode and said second container means.

5. Apparatus according to claim 1 wherein said anode is maintained at a positive potential of at least 50,000 volts relative to said cathode and the current density within the interelectrode spacing is at least 1 amp per square centimeter.

6. Apparatus according to claim 5 wherein said fluorescer molecules of said fluorescer gas are maintained at a partial pressure of at least 5 torr.

7. Apparatus according to claim 6 wherein said fluorescer molecules of said fluorescer gas consist of rare gas-halides, maintained at a partial pressure of 5–50 torr, that produce fluorescence radiation of wavelengths $\lambda <$ 2500 A when excited.

8. Apparatus according to claim 6 wherein said fluorescer gas includes molecules which are superfluorescent and are maintained at a partial pressure of 5–50 torr.

9. Apparatus according to claim 8 wherein said fluorescent molecules are selected from the group consisting of Xe, Kr, Ar, ArCl and KrF.

10. Apparatus according to claim 8 wherein said second container means is a secondary laser cell spaced from said first container means, and said first container means is an optical cavity with a mirror, capable of reflecting radiation from said superfluorescent molecules, located at at least one end thereof, the other end of said first container means being oriented to direct the superfluorescent radiation toward said second container means, whereby the superfluorescent radiation optically pumps said second gas and causes it to undergo laser action.

11. Apparatus according to claim 1 wherein said stimulable molecules of said second gas are selected from the group consisting of $(CF_3)_2AsI$, $CH_3(C_2F_5)AsI$, $CH_3(C_3F_7)AsI$, $(C_2F_5)_2AsI$, $(C_3F_7)_2AsI$, $(CF_3)_2PI$, $CF_3(C_2F_5)PI$, $CF_3(C_3F_7)PI$, $(C_2F_5)_2PI$, $(C_3F_7)_2PI$, $CF_3(CH_3)PI$, $CF_3PI(CN)$, $CF_3(CF_2Cl)PI$, $F_3PI$, $OPF_2I$ and $CF_3SbI$, maintained at a partial pressure of at least 1 torr.

12. Apparatus according to claim 1 wherein said stimulable molecules of said second gas are selected from the group consisting of $CH_3CN$, $HCN$, $CF_3CN$, $C_2F_5Cn$, $BrCN$ and $(CN)_2$, maintained at a partial pressure of 0.5–15 torr.

13. Apparatus according to claim 1 wherein said stimulable molecules of said second gas are selected from the group consisting of $CS_2$, $CSe_2$, $OCS$, $OCSe$, $OCTe$, $CO_2$, $NO_2$ and $N_2O$, maintained at a partial pressure of 1–100 torr.

14. Apparatus according to claim 1, further including
   a secondary source of electrons operatively associated with said anode and
   a secondary anode, spaced apart from said first anode so that said fluorescer gas lies substantially between the two anodes, the secondary anode being maintained at a positive potential of at least 10,000 volts relative to said first anode so as to provide a current density between said first anode and the secondary anode of at least 1 amp per square centimeter.

15. Apparatus according to claim 14 wherein said scondary anode is a wire mesh.

16. A method of producing stimulated emission of substantially monochromatic radiation by action of a beam of highly energetic electrons, the method comprising the steps of:
   exciting a fluorescer gas by direct action of the electron beam, the fluorescer gas being chosen to emit fluorescence radiation at wavelengths substantially between 1200 A and 2500 A;

passing the fluorescer gas radiation through a second gas, located in an adjacent optical cavity which cavity is substantially transparent to the fluorescer gas radiation, the second gas being chosen to absorb radiation in the wavelength range in which the fluorescer gas radiation is emitted; and allowing the second gas to undergo laser transitions and to radiate in a chosen direction.

17. A method according to claim 16 wherein said beam is an electron beam with electrons accelerated to at least 10,000 electron volt energies.

18. A method according to claim 16 further including the step of providing a low level sustainer current to augment the e-beam pulse.

* * * * *